United States Patent
Javed

(10) Patent No.: US 9,439,094 B2
(45) Date of Patent: *Sep. 6, 2016

(54) MONITORING PROBE FOR IDENTIFYING A USER PLANE IDENTIFIER OF A USER DEVICE

(71) Applicant: CellOS Software LTD, Melbourne (AU)

(72) Inventor: Adnan Javed, Fawkner (AU)

(73) Assignee: CellOS Software LTD, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,673

(22) Filed: Jan. 13, 2016

(65) Prior Publication Data

US 2016/0127933 A1 May 5, 2016

Related U.S. Application Data

(63) Continuation of application No. 14/208,902, filed on Mar. 13, 2014, now Pat. No. 9,277,429.

(60) Provisional application No. 61/862,664, filed on Aug. 6, 2013, provisional application No. 61/878,727, filed on Sep. 17, 2013.

(51) Int. Cl.
*H04W 24/08* (2009.01)
*H04L 12/26* (2006.01)

(52) U.S. Cl.
CPC .............. *H04W 24/08* (2013.01); *H04L 43/12* (2013.01)

(58) Field of Classification Search
CPC .................................................... H04W 24/08

USPC .......................................................... 370/241
See application file for complete search history.

(56) References Cited

U.S. PATENT DOCUMENTS

| 7,558,234 | B2 | 7/2009 | Dommaraju et al. |
| 8,514,756 | B1 | 8/2013 | Ramachandra et al. |
| 2009/0088147 | A1 | 4/2009 | Bu et al. |
| 2010/0238887 | A1 | 9/2010 | Koodli et al. |
| 2010/0291943 | A1 | 11/2010 | Mihaly et al. |
| 2011/0136488 | A1 | 6/2011 | Kovvali et al. |
| 2011/0158090 | A1 | 6/2011 | Riley et al. |
| 2011/0188379 | A1 | 8/2011 | Calippe et al. |
| 2012/0087260 | A1 | 4/2012 | Devarapalli et al. |
| 2012/0155324 | A1 | 6/2012 | Janakiraman et al. |
| 2012/0159151 | A1 | 6/2012 | Janakiraman et al. |
| 2012/0282956 | A1 | 11/2012 | Kim et al. |
| 2013/0072222 | A1 | 3/2013 | Weill et al. |
| 2013/0083650 | A1 | 4/2013 | Taleb et al. |

(Continued)

*Primary Examiner* — Parth Patel
(74) *Attorney, Agent, or Firm* — Duane Morris LLP

(57) ABSTRACT

Methods of identifying a user plane identifier of a user device by a monitoring probe in communication with a network device, the monitoring probe, and the system using the same are disclosed. In an embodiment, the monitoring probe includes a monitor, a comparator and a user plane identifier output. The monitor monitors a network device for receipt of a first control plane message comprising a first control plane identifier and a user device identifier, and monitors the network device for receipt of a second control plane message comprising a second control plane identifier and a user plane identifier. The comparator compares the first with the second control plane identifier to determine whether the control plane identifiers correspond. The user plane identifier output outputs the user plane identifier being identified as that of the user device, when the control plane identifiers correspond.

13 Claims, 8 Drawing Sheets

(56) References Cited

U.S. PATENT DOCUMENTS

| | | |
|---|---|---|
| 2013/0183971 A1 | 7/2013 | Tamaki et al. |
| 2013/0188481 A1 | 7/2013 | Maehara et al. |
| 2013/0189994 A1 | 7/2013 | Maehara et al. |
| 2013/0279420 A1 | 10/2013 | Nishida et al. |
| 2013/0301611 A1 | 11/2013 | Baghel et al. |
| 2014/0003333 A1 | 1/2014 | Ivershen et al. |
| 2014/0029501 A1* | 1/2014 | Maehara ............... H04W 36/16 370/312 |
| 2014/0160940 A1 | 6/2014 | Maehara et al. |
| 2014/0179360 A1 | 6/2014 | Jackson et al. |
| 2014/0192782 A1* | 7/2014 | Centonza .......... H04W 36/0005 370/331 |
| 2014/0241158 A1 | 8/2014 | Anthony et al. |
| 2014/0328204 A1 | 11/2014 | Klotsche et al. |
| 2015/0016413 A1 | 1/2015 | Sirotkin et al. |

* cited by examiner

MONITORING PROBE FOR IDENTIFYING A USER PLANE IDENTIFIER OF A USER DEVICE

RELATED APPLICATION

This application is a continuation of and claims the priority date of co-pending U.S. application Ser. No. 14/208, 902, entitled "Monitoring Probe for Identifying a User Plane Identifier of a User Device" which was filed on 13 Mar. 2014 and which claims the priority date of U.S. Provisional Patent Application No. 61/862,664 filed on 6 Aug. 2013 and U.S. Provisional Patent Application No. 61/878,727 filed on 17 Sep. 2013, the disclosures of each of the above are hereby incorporated herein by reference.

FIELD OF INVENTION

The present invention is generally (but not exclusively) related to a monitoring probe for identifying a user plane identifier of a user device.

BACKGROUND

In a complex network (such as one that conform to the Third Generation Partnership Project (3GPP) Long Term Evolution (LTE) standard), collating statistical data on data transmission of users is difficult, as there is usually a lot of users simultaneously using the network and a large amount of data being transmitted through the network at the same time. Thus, operators of such complex networks commonly rely on dedicated external monitoring systems (rather than the networks themselves) for collating statistical data on data transmission of users. However, the external monitoring systems do not directly interact with the users of the networks to which they are monitoring, and some of the data being transmitted through the network is ciphered or encrypted. Thus, it is difficult to differentiate between data from different users from the statistical data provided by an external monitoring system.

SUMMARY OF INVENTION

The invention provides a method of identifying a user plane identifier of a user device by a monitoring probe in communication with a network device, the method comprising:

Monitoring the network device for receipt of a first control plane message comprising a first control plane identifier and a user device identifier;

In response to receipt of the first control plane message, monitoring the network device for receipt of a second control plane message comprising a second control plane identifier and a user plane identifier;

In response to receipt of the second control plane message, comparing the first control plane identifier with the second control plane identifier in order to determine whether or not the first control plane identifier corresponds to the second control plane identifier;

In response to a determination that the first control plane identifier corresponds to the second control plane identifier, outputting the user plane identifier such that the user plane identifier is identified as the user plane identifier of the user device.

In an embodiment, the user plane identifier of the user device is arranged to identify one or more data packets transmitted from another network device to the network device.

In an embodiment, the network device is an evolved NodeB (eNB) and the other network device is a Serving-Gateway (S-GW).

In an embodiment, the second control plane message is an Initial Context Setup Response Message, and the user plane identifier is a user plane evolved NodeB Internet Protocol address (eNB IP address) or a user plane evolved NodeB Tunnelling End Identity (eNB TEID).

The invention also provides a method of identifying a user plane identifier of a user device by a monitoring probe in communication with a first network device and a second network device, the method comprising:

Monitoring the first network device for receipt of a first control plane message comprising a first control plane identifier and a user device identifier;

In response to receipt of the first control plane message, monitoring the second network device for receipt of a second control plane message comprising a second control plane identifier and a user plane identifier;

In response to receipt of the second control plane message, comparing the first control plane identifier with the second control plane identifier in order to determine whether or not the first control plane identifier corresponds to the second control plane identifier;

In response to a determination that the first control plane identifier corresponds to the second control plane identifier, outputting the user plane identifier such that the user plane identifier is identified as the user plane identifier of the user device.

In an embodiment, the user plane identifier of the user device is arranged to identify one or more data packets transmitted from the first network device to the second network device.

In an embodiment, the first network device is an evolved NodeB (eNB) and the second network device is a Mobility Management Entity (MME).

In an embodiment, the second control plane message is an Initial Context Setup Request Message, and the user plane identifier is a user plane Serving-Gateway Internet Protocol address (S-GW IP address) or a user plane Serving-Gateway Tunnelling End Identity (S-GW TEID).

In an embodiment, the user plane identifier is output in association with the user device identifier to a memory for storage, in order to identify the user plane identifier as the user plane identifier of the user device. Alternatively, the method may further comprise outputting the user device identifier, wherein the user plane identifier is output after the user device identifier is output in order to identify the user plane identifier as the user plane identifier of the user device.

In an embodiment, each one of the first control plane identifier and the second control plane identifier is an evolved NodeB S1 Application Protocol Identifier (eNB-UE-S1AP-ID).

In an embodiment, the first control plane message is an Attach Request message or an Identity Response message.

In an embodiment, the user device identifier is an International Mobile Subscriber Identity (IMSI) or a Globally Unique Temporary Identity (GUTI).

In an embodiment, the method further comprises:

Monitoring the second network device for receipt of a third control plane message comprising another user device identifier and a third control plane identifier;

In response to receipt of the third control plane message, monitoring a third network device for receipt of a fourth control plane message comprising a fourth control plane identifier and a first control plane parameter;

In response to receipt of a fourth control plane message, comparing the third control plane identifier with the fourth control plane identifier in order to determine whether or not the third control plane identifier corresponds to the fourth control plane identifier;

In response to a determination that the third control plane identifier corresponds to the fourth control plane identifier, monitoring the first network device for receipt of a fifth control plane message comprising a sixth control plane message and a seventh control plane message;

In response to receipt of a fifth control plane message, comparing the comparing the first control plane parameter with the second control plane parameter in order to determine whether or not the first control plane parameter corresponds to the second control plane parameter;

In response to a determination that the first control plane parameter corresponds to the second control plane parameter, comparing the sixth control plane message with the first control plane identifier in order to determine whether or not the sixth control plane message corresponds to the first control plane identifier; and In response to a determination that the sixth control plane message corresponds to the first control plane identifier, outputting the other user device identifier such that the other user plane identifier is identified as the user plane identifier of the user device.

In an embodiment, the third network device is a Home Subscriber Server (HSS).

In an embodiment, the third control plane message is an Authentication Information Request message, the fourth control plane message is an Authentication Information Answer message, and the fifth control plane message is an Authentication Response message.

In an embodiment, the other user device identifier is an International Mobile Subscriber Identity (IMSI), each one of the third control plane identifier and the fourth control plane identifier is a sequence number, the first control plane parameter is an expected authentication result (XRES) parameter, the sixth control plane message is an evolved NodeB S1 Application Protocol Identifier (eNB-UE-S1AP-ID), and the second control plane parameter is an authentication result (RES) parameter.

The invention also provides a monitoring probe for identifying a user plane identifier of a user device, the monitoring probe comprising:

A control plane message monitor adapted to:

Monitor a network device for receipt of a first control plane message comprising a first control plane identifier and a user device identifier; and Monitor the network device for receipt of a second control plane message comprising a second control plane identifier and a user plane identifier, in response to receipt of the first control plane message by the control plane message monitor;

A control plane identifier comparator adapted to compare the first control plane identifier with the second control plane identifier in order to determine whether or not the first control plane identifier corresponds to the second control plane identifier, in response to receipt of the second control plane message by the control plane message monitor; and A user plane identifier output adapted to output the user plane identifier such that the user plane identifier is identified as the user plane identifier of the user device, in response to a determination by the control plane identifier comparator that the first control plane identifier corresponds to the second control plane identifier.

The invention also provides a system for analysing one or more data packets of a user device, the system adapted to:

Receive a user plane identifier of the user device from the above monitoring probe;

Identify one or more data packets of the user device from a plurality of data packets transmitted from another network device to the above network device; and Perform an analysis of the one or more data packets.

The invention also provides a monitoring probe for identifying a user plane identifier of a user device, the monitoring probe comprising:

A control plane message monitor adapted to:

Monitor a first network device for receipt of a first control plane message comprising a first control plane identifier and a user device identifier; and Monitor a second network device for receipt of a second control plane message comprising a second control plane identifier and a user plane identifier, in response to receipt of the first control plane message by the control plane message monitor;

A control plane identifier comparator adapted to compare the first control plane identifier with the second control plane identifier in order to determine whether or not the first control plane identifier corresponds to the second control plane identifier, in response to receipt of the second control plane message by the control plane message monitor; and A user plane identifier output adapted to output the user plane identifier such that the user plane identifier is identified as the user plane identifier of the user device, in response to a determination by the control plane identifier comparator that the first control plane identifier corresponds to the second control plane identifier.

The invention also provides a system for analysing one or more data packets of a user device, the system adapted to:

Receive a user plane identifier of the user device from the above monitoring probe;

Identify one or more data packets of the user device from a plurality of data packets transmitted from the above first network device to the above second network device; and Perform an analysis of the one or more data packets.

BRIEF DESCRIPTION OF DRAWINGS

In order that the invention may be more clearly ascertained, embodiments of the invention will be described, by way of example, with reference to the accompanying drawings in which.

DETAILED DESCRIPTION

Referring to the accompanying drawings, there is illustrated a monitoring probe 13 for identifying a user plane identifier (for example, a user plane Serving-Gateway Internet Protocol address (S-GW IP address), a user plane S-GW Tunnelling End Identity (S-GW TEID), an Evolved Node B IP address (eNB IP address), or a eNB TEID) of a user device 122 (that is, a User Equipment (UE)) of a network 10. When in use, the monitoring probe 13 monitors one or more network devices of the network 10 for receipt of two control plane messages. Each of the control plane messages comprises a control plane identifier. Also, one of the control plane messages comprises a user device identifier, and the other one of the control messages comprises a user plane identifier. The monitoring probe 13 is arranged to compare the control plane identifiers of the respective control plane messages to determine whether or not the control plane identifiers correspond to each other. If so, the monitoring probe 13 outputs the user plane identifier such that the user plane identifier is identified as the user plane identifier of the user device 122.

The monitoring probe is adapted to identify a user plane identifier of a user device of a network that conforms to the 3GPP LTE standard. Thus, many of the terms mentioned in this specification are technical terms defined by the Third Generation Partnership Project (3GPP). For example, the terms "user plane" and "control plane" refer respectively to the user plane architecture and the control plane architecture of the radio protocol architecture of the 3GPP LTE standard. Persons skilled in the art will appreciate that user data is carried on the user plane and control/signalling information is carried on the control plane.

Persons skilled in the art will appreciate that the monitoring probe is typically a passive monitoring probe that does not directly transmit to any of the network device or devices monitored by the monitoring probe, but could alternatively be an active monitoring probe that interacts directly with one or more of the network device or devices.

Figure 1:
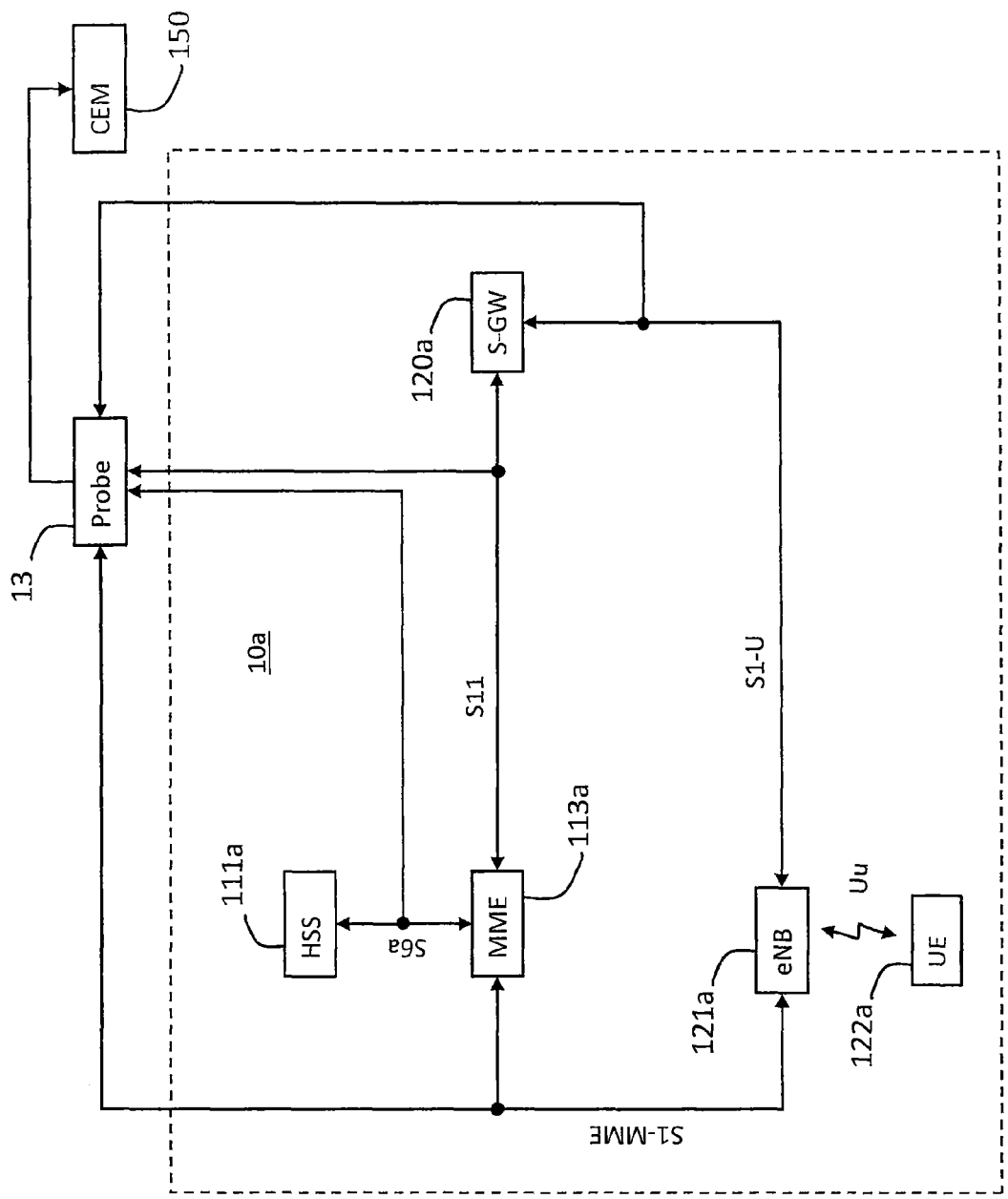
FIG. 1 is a schematic diagram illustrating a network in connection with a monitoring probe according to an embodiment of the invention.

FIG. 1 is a schematic diagram illustrating the monitoring probe 13 for identifying the user plane identifier of a user device 122*a* of the network 10*a*. The user device 122*a* is connected to an eNB 121*a* of the network 10*a*, and data may be communicated between the user device 122*a* and the eNB 121*a*. Persons skilled in the art will appreciate that data between the user device 122*a* and the eNB 121*a* is typically communicated over a radio channel on an air interface in the form of a Uu interface.

The eNB 121*a* is connected to an MME 113*a* of the network 10*a* which in turn is connected to a Home Subscriber Service (HSS) server 111*a* of the network 10*a* and an S-GW 120*a* (or Serving General Packet Radio Service (GPRS) Support Node (SGSN)) of the network 10*a*. Control plane messages are communicated between the eNB 121*a* and the MME 113*a* on a control plane interface in the form of a S1-MME interface. Control plane messages are communicated between the MME 113*a* and the HSS 111*a* on another control plane interface in the form of an S6a interface. Control plane messages are communicated between the MME 113*a* and the S-GW 120*a* on another control plane interface in the form of a S11 interface. The S-GW 120*a* is also connected to the eNB 121*a*. User plane messages are communicated between the S-GW 120*a* and the eNB 121*a* on a user plane interface in the form of a S1-U interface. Persons skilled in the art will appreciate that data may be bi-directionally communicated between any of these two devices. For example, the data communicated between the user device 122*a* and the eNB 121*a* may be in either an uplink direction from the user device 122*a* to the eNB 121*a* or in a downlink direction from the eNB 121*a* to the user device 122*a*.

The monitoring probe 13 is connected to the S1-MME interface between the eNB 121*a* of the network and the MME 113*a* of the network, and is adapted to monitor (that is, "sniff") the S1-MME interface between the eNB 121*a* and the MME 113*a* for control plane messages or packets communicated between the eNB 121*a* and the MME 113*a* on the S1-MME interface. The monitoring probe 13 is also connected to the S6a interface between the MME 113*a* and the HSS 111*a*, and is adapted to monitor the S6a interface between the MME 113*a* and the HSS 111*a* for control plane messages or packets communicated between the MME 113*a* and the HSS 111*a* on the S6a interface. The monitoring probe 13 is also connected to the S11 interface between the MME 113*a* and the S-GW 120*a*, and is adapted to monitor the S11 interface between the MME 113*a* and the S-GW 120*a* for control plane messages or packets communicated between the MME 113*a* and the S-GW 120*a* on the S11 interface. The monitoring probe 13 is also connected to the S1-U interface between the eNB 121*a* and the S-GW 120*a*, and is adapted to monitor the S1-U interface between the eNB 121*a* and the S-GW 120*a* for user plane messages or packets communicated between the eNB 121*a* and the S-GW 120*a* on the S1-U interface.

The monitoring probe 13 is also connected to a Customer Experience Management (CEM) system 150, and is configured to output a user plane identifier to the CEM system 150 such that the user plane identifier can be identified by the CEM system 150 as the user plane identifier of the user device 122*a*. It is envisaged that the monitoring probe 13 may also be additionally configured to transmit or report information (such as traffic flow statistics derived from the user plane messages or packets communicated on the S1-U interface, and/or the control plane messages on the S1-MME interface and/or on the S11 interface) to the CEM system 150.

It is envisaged that an alternative embodiment of the monitoring probe 13 may not be connected to all of the interfaces mentioned above. For example, in an alternative embodiment, the monitoring probe 13 may be connected only to the eNB 121*a* on the S1-MME interface, and is adapted to only monitor the eNB 121*a* for control plane messages transmitted from the eNB 121*a* to the MME 113*a* on the S1-MME interface.

Figure 2:
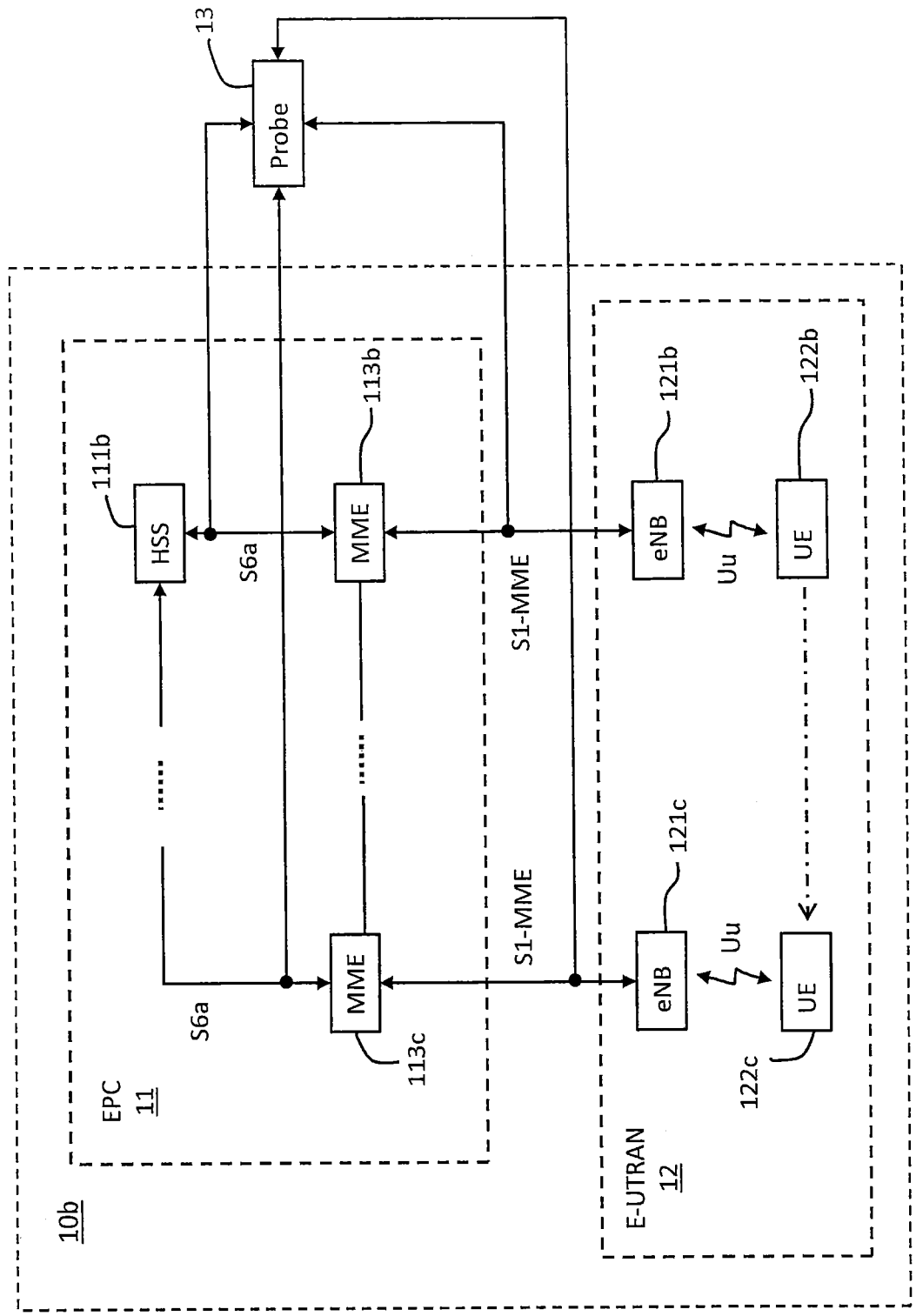
FIG. 2 is a schematic diagram illustrating the monitoring probe of FIG. 1 in connection with another network.

FIG. 2 is a schematic diagram illustrating the monitoring probe 13 in connection with an alternative network 10*b*. As illustrated, the network 10*b* includes two eNBs 121*b*, 121*c* in connection with (i) two MMES 113*b*, 113*c* respectively and (ii) two UEs 122*b*, 122*c* respectively. The eNBs 121*b*, 121*c* and the UEs 122*b*, 122*c* are part of the Evolved Universal Terrestrial Radio Access Network (E-UTRAN) portion 12 of the network 10*b*. The MMEs 113*b*, 113*c*, HSS 111*b* and S-GW 120*b* (not shown) are part of the Evolved Packet Core (EPC) portion 11 of the network 10*b*.

Figure 3:
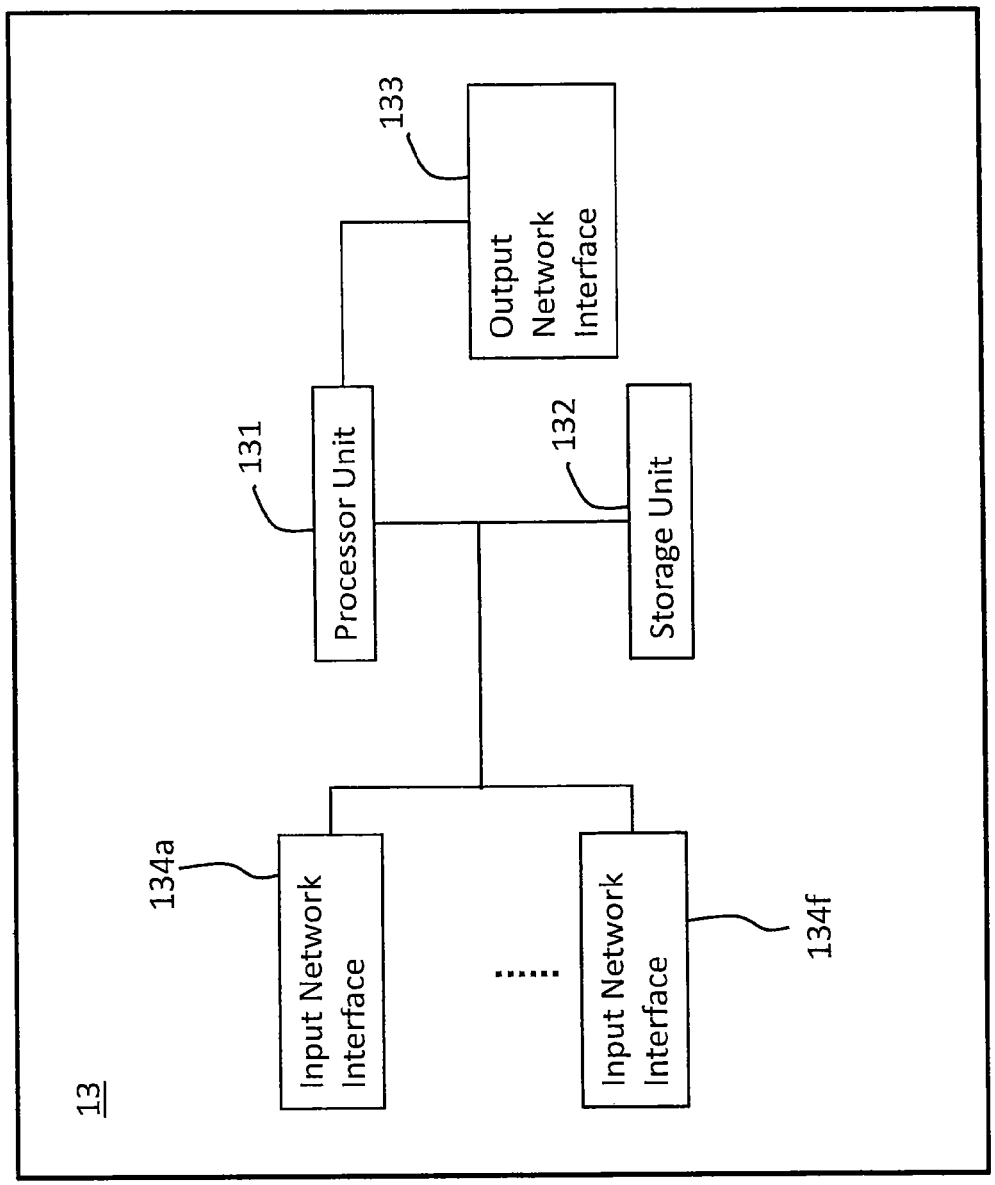
FIG. 3 is a schematic diagram of physical components of the monitoring probe of FIG. 1.

FIG. 3 is a schematic diagram of physical components of the monitoring probe 13. The monitoring probe 13 includes a processor unit 131, a storage unit 132, an output network interface 133, and one or more input network interfaces 134*a* . . . 134*f*. It is envisaged that the monitoring probe 13 will typically include more than one input network interface 134. However, a person skilled in the art will appreciate that an embodiment of the monitoring probe 13 may include only one input network interface 134. For example, in an embodiment of the monitoring probe 13 where the monitoring probe 13 is configured to only monitor for the control plane messages transmitted from the eNB 121 to the MME 113 on the S1-MME interface, the monitoring probe 13 may have only one input network interface 134.

Each of the input network interfaces 134a . . . 134f is connected to a respective one of the eNB 121, MME 113, HSS 111 and S-GW 120 on a high-speed link. The processor unit 131 is configured to implement (or execute) a number of software modules based on program code and/or data stored in the storage unit 132. In particular, the memory unit 32 stores program code for implementing software modules for identifying a user plane identifier of the user device 122.

Figure 4:
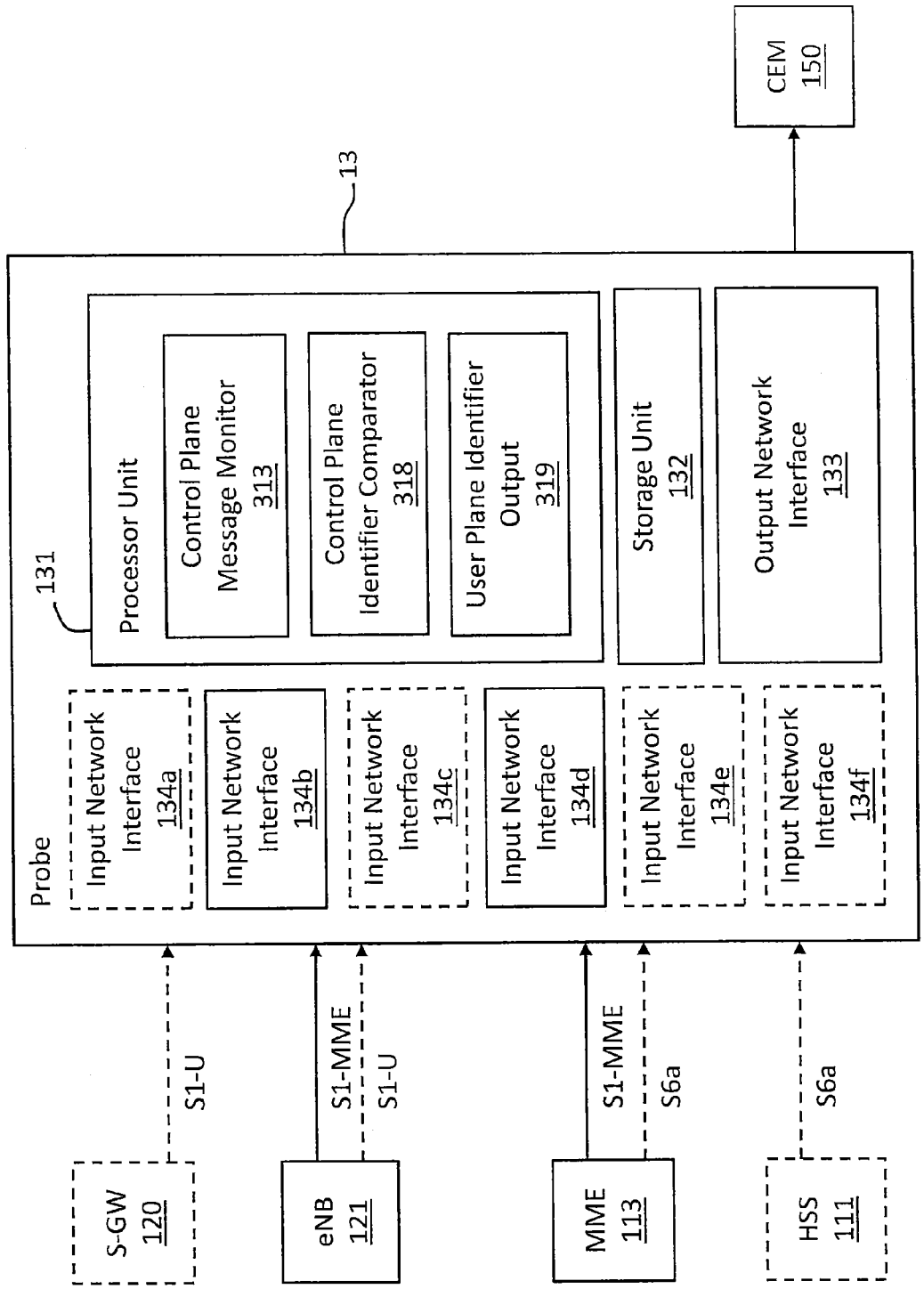
FIG. 4 is a schematic diagram of the functional components of the monitoring probe 13 of FIG. 1.

FIG. 4 is a schematic diagram of the functional components of the monitoring probe 13 for identifying the user plane identifier of a user device 122 of the network 10. In this embodiment, the functional components are software modules implemented by the processor unit 131 of the monitoring probe 13. However, persons skilled in the art will appreciate that one or more of the functional components could alternatively be implemented in some other way, for example, by one or more dedicated circuits.

One of the software modules implemented by the processor unit 131 is a control plane message monitor 313. The control plane message monitor 313 is adapted to monitor one or more of the network devices of the network 10 for receipt of at least two control plane messages. Each of the control plane messages comprises at least one control plane identifier. Also, at least one of the control plane messages comprises at least one user device identifier, and at least another one of the control plane messages comprises at least one user plane identifier.

Referring to FIG. 4, the processor unit 131 is electrically connected to at least Input Network Interfaces 134b, 134d. In some embodiments, the Processor Unit 131 is electrically connected to Input Network Interfaces 134a-134f. Also, the processor unit 131 is connected to the storage unit 132 and the output network interface 133.

When the control plane message monitor 313, control plane identifier comparator or user plane identifier output 319 are implemented as software modules, the control plane message monitor 313, control plane identifier comparator or user plane identifier output 319 are communicatively connected to each other. Also, the control plane message monitor 313 is communicatively connected to some or all of the Input Network Interfaces 134a-134f. In alternative embodiment, when the control plane message monitor 313, control plane identifier comparator or user plane identifier output 319 are implemented in dedicated electronic circuits, the control plane message monitor 313, control plane identifier comparator or user plane identifier output 319 are electrically connected to each other, and the control plane message monitor 313 is electrically connected to some or all of the Input Network Interfaces 134a-134f.

In a first embodiment of the monitoring probe 13, the control plane message monitor 313 first monitors the one or more network devices for a first control plane message comprising a first control plane identifier and a user device identifier. The one or more network devices monitored by the control plane message monitor 313 for receipt of the first control plane message is an eNB 121 of the network 10. The first control plane message can be either an Attach Request message, or an Identity Response message transmitted over a S1-MME interface between the eNB 121 and a corresponding MME 113 (that is, a MME 113 in communication with the eNB 121 over the S1-MME interface). When the monitoring probe 13 is in use, the control plane message monitor 313 monitors the eNB 121 via the input network interface 134 in communication with the eNB 121 for receipt of either an Attach Request message or an Identity Response message. If the first control plane message is an Attach Request message, the first control plane identifier is a control plane evolved NodeB S1 Application Protocol Identifier (eNB-UE-S1AP-ID) in the Attach Request message, and the user device identifier is either an International Mobile Subscriber Identity (IMSI) or a Globally Unique Temporary Identity (GUTI). If the first control plane message is an Identity Response message, the first control plane identifier is a control plane eNB-UE-S1AP-ID in the Identity Response message, and the user device identifier is an IMSI.

In response to receipt of the first control plane message, the control plane message monitor 313 then monitors the eNB 121 over the S1-MME interface between the eNB 121 and the MME 113 for receipt of a second control plane message comprising a second control plane identifier and a user plane identifier. The second control plane message is an Initial Context Setup Response Message comprising (i) a second control plane identifier in the form of a control plane eNB-UE-S1AP-ID and (ii) a user plane identifier in the form of either a user plane eNB Internet Protocol (IP) address or a user plane eNB Tunnelling End Identity (TEID).

In an alternative second embodiment of the monitoring probe 13, instead of monitoring the eNB 121 for receipt of the second control plane message, the control plane message monitor 313 monitors the MME 113 corresponding to the eNB 121 over the S1-MME interface between the eNB 121 and the MME 113 for receipt of the second control plane message transmitted from the MME 113 to the eNB 121. Specifically, in response to receipt of a first control plane message in the form of either an Attach Request message or an Identity Response message from the eNB 121, the control plane message monitor 313 monitors the MME 113 for receipt of a second control plane message in the form of an Initial Context Setup Request message comprising (i) a second control plane identifier in the form of a control plane eNB-UE-S1AP-ID and (ii) a user plane identifier in the form of either a Serving-Gateway Internet Protocol address (S-GW IP address) or a user plane S-GW Tunnelling End Identity (S-GW TEID).

In the second embodiment where the one or more network devices monitored by the control plane message monitor 313 for receipt of the second control plane message is an MME 113 of the network 10, the control plane message monitor 313 monitors the MME 113 via the input network interface 134 in communication with the MME 113 for receipt of the Initial Context Setup Request message, upon receipt of the first control plane message (that is, the Attach Request message or Identity Response message). In the first embodiment where the one or more network devices monitored by the control plane message monitor 313 for receipt of the second control plane message is the eNB 121, the control plane message monitor 313 monitors the eNB 121 via the input network interface 134 in communication with the eNB 121 for receipt of the Initial Context Setup Response message, upon receipt of the first control plane message (that is, the Attach Request message or Identity Response message).

Another one of the software modules implemented by the processor unit 131 is a control plane identifier comparator 318. The control plane identifier comparator 318 is adapted to compare the first control plane identifier received by the control plane message monitor 313 with the second control plane identifier subsequently received by the control plane message monitor 313, in order to determine whether or not the first control plane identifier received by the control plane message monitor 313 corresponds to the second control plane identifier subsequently received by the control plane message monitor 313. The control plane identifier comparator 318 make this comparison in response to the control plane message monitor 313 receiving the second control plane identifier.

Thus, when the monitoring probe 13 is in use, the control plane identifier comparator 318 compares (i) the control plane eNB-UE-S1AP-ID of either the Attach Request message or the Identity Response message received by the control plane message monitor 313 from the eNB 121 to (ii) the control plane eNB-UE-S1AP-ID of either the Initial Context Setup Response Message received by the control plane message monitor 313 from the eNB 121 or the Initial Context Setup Request Message received by the control plane message monitor 313 from the MME 133, and determines whether or not (i) corresponds to (ii) based on the comparison.

As indicated above, control plane eNB-UE-S1AP-IDs of the first control plane message and the second control plane message are used to determine whether or not the first control plane message and the second control plane message are inter-related. It is envisaged that a control plane identifier other than the control plane eNB-UE-S1AP-ID may be used to determine whether or not the first control plane message and the second control plane message are inter-related. For example, in an alternative embodiment, control plane MME-UE-S1AP-IDs of the first control plane message and the second control plane message may alternatively be used to determine whether or not the first control plane message and the second control plane message are inter-related.

The processor unit 131 also implements a user plane identifier output 319 adapted to, in response to a determination by the control plane identifier comparator 318 that the first control plane identifier received by the control plane message monitor 313 corresponds to the second control plane identifier received by the control plane message monitor 313, output the user plane identifier received by the control plane message monitor 313 such that the user plane identifier is identified as the user plane identifier of the user device 122.

Thus, upon a determination by the control plane identifier comparator 318 that (i) the control plane eNB-UE-S1AP-ID of either the Attach Request message or the Identity Response message received by the control plane message monitor 313 from the eNB 121 corresponds to (ii) the control plane eNB-UE-S1AP-ID of either the Initial Context Setup Response Message received by the control plane message monitor 313 from the eNB 121 or the Initial Context Setup Request Message received by the control plane message monitor 313 from the MME 133, the user plane identifier output 319 outputs (a) either the user plane eNB IP address or the user plane eNB TEID received by the control plane message monitor 313 from the eNB 121 or (b) either the user plane S-GW IP address or the user plane S-GW TEID received by the control plane message monitor 313 from the MME 113, such that the user plane eNB IP address, the user plane eNB TEID, the user plane S-GW IP address or the user plane S-GW TEID is identified with the user device identifier (that is, either the IMSI or GUTI) of the user device 122 received by the control plane message monitor 313 from the eNB 121.

The user plane identifier output by the user plane identifier output 319 is communicated via an output network interface 133 of the monitoring probe 13 to the CEM system 150. The CEM system 150 is adapted to receive the user plane identifier of the user device 122 output by the output network interface 133, to identify the data packets of the user device 122 communicated between the S-GW 120 and the eNB 121 in the user plane (that is, on the S1-U interface between the S-GW 120 and the eNB 121) based on the user plane identifier (that is, the user plane eNB IP address, the user plane eNB TEID, the user plane S-GW IP address or the user plane S-GW TEID) received by the CEM system 150, and to perform an analysis of the data packets of the user device 122 identified by the CEM system 150. Persons skilled in the art will appreciate that the data packets communicated between the S-GW 120 and the eNB 121 on the S1-U interface may be encapsulated in a GTPv1 tunnel or an IP packet, and may be identified by a user plane TEID in a GTPv1 header or a user plane IP address in an IP header (such as a user plane S-GW TEID in a GTPv1 header or a user plane S-GW IP address in an IP header for data packets transmitted from the eNB 121 to S-GW 120 in the uplink case, or by a user plane eNB TEID in a GTPv1 header or a user plane eNB IP address in an IP header for data packets transmitted from the S-GW 120 to eNB 121 in the downlink).

In addition to implementing the above mentioned software modules, the processor unit 131 is also configured to store in the storage unit 132 data and/or information comprising or derived from the data packets (such as the user plane identifier) received by the probe 13. For example, the processor unit 131 may store in the storage unit 132 the identifiers received by the probe, for building a mapping table for enabling subscribers (such as the CEM system 150) of the monitoring probe 13 to identify user specific tunnels (that is, specific logical connections of users) traversed on the user plane.

It is envisaged that an embodiment of the monitoring probe 13 may include either one input network interface 134 in communication with an eNB 121 of the network 10, or two input network interfaces 134 in communication with respectively an eNB 121 and a corresponding MME 113 of the network 10. That is, an embodiment may not include input network interfaces 134 in communication with respectively a S-GW 120, a HSS 111 or both a S-GW 120 and a HSS 111 (that is, the network devices indicated by dotted lines in FIG. 4) of the network 10.

Also, it is envisaged that messages other than the first control plane message and the second control plane message may be received by the control plane message monitor 313 of the monitoring probe 13 while the control plane message monitor 313 is monitoring the eNB 121, the MME 113 or both the eNB 121 and the MME 112. For example, the control plane message monitor 313 may receive an Authentication Response message from the eNB 121 after receiving a first control plane message in the form of an Attach Request message from the eNB 121, while the control plane message monitor 313 is monitoring for a second control plane message in the form of an Initial Context Setup Response Message from the eNB 121.

It is also envisaged that the monitoring probe 13 may associate identifiers from different messages. For example, the monitoring probe 13 may associate the MME-UE-S1AP-ID received from the Authentication Response message with the IMSI received from the Attach Request message. It is envisaged that the monitoring probe 13 may associate identifiers with one another in different ways. For example, a MME-UE-S1AP-ID received from an Authentication Response message may be associated with an IMSI received from an Attach Request message, by storing the MME-UE-S1AP-ID in association with the IMSI in the storage unit 132. In another example, the MME-UE-S1AP-ID and the IMSI may be associated with each other, by outputting the MME-UE-S1AP-ID together with the IMSI or by outputting the MME-UE-S1AP-ID and the IMSI one after another.

Also, in the above mentioned first and second embodiments of the monitoring probe 13, the control plane message monitor 313 monitors for only two control plane messages, and either the eNB 121 only or the eNB 121 and the MME 113. It is envisaged that the control plane message monitor 313 may, in alternative embodiment of the monitoring probe 13, monitor (i) for more than two control plane messages (that is, in addition to a first control plane message and a second control plane message), and (ii) another network device or devices (that is, other than just the eNB 121 or the eNB 121 and the MME 113).

For example, in an alternative third embodiment of the monitoring probe 13, the control plane message monitor 313 may monitor:

(i) first an MME 113 for receipt of a first control plane message in the form of an Authentication Information Request message comprising a user device identifier in the form of an IMSI and a control plane identifier in the form of a sequence number;

(ii) then a corresponding HSS 111 (that is, a HSS 111 in communication with the MME 113 on a S6a interface between the HSS 111 and the MME 113) for receipt of a second control plane message in the form of an Authentication Information Answer message comprising a control plane identifier in the form of a sequence number and a control plane parameter in the form of an expected authentication result (XRES);

(iii) followed by a corresponding eNB 121 (that is, an eNB 121 in communication with the MME 113 on a S1-MME interface between the eNB 121 and the MME 113) for receipt of a third control plane message in the form of an Authentication Response message comprising a control plane parameter in the form of an authentication result (RES) and a control plane identifier in the form of a control plane eNB-UE-S1AP-ID; and (iv) finally either the eNB 121 for a fourth control plane message in the form of an Initial Context Setup Request message comprising a control plane identifier in the form of a control plane eNB-UE-S1AP-ID and a user plane identifier in the form of a S-GW IP address or a S-GW TEID), or a fourth control plane message in the form of an Initial Context Setup Response message comprising a control plane identifier in the form of a control plane eNB-UE-S1AP-ID and a user plane identifier in the form of an eNB IP address) or a an eNB TEID.

In such a third embodiment of the monitoring probe 13, the control plane identifier comparator 318 compares (1) the sequence number in the Authentication Information Request message received from the MME 113 to the sequence number in the Authentication Information Answer message received from the HSS 111, and determines whether or not the two sequence numbers correspond to each other. Upon a determination that the two sequence numbers correspond to each other, the control plane identifier comparator 318 compares (2) the XRES in the Authentication Information Answer message received from the HSS 111 to the RES in the Authentication Response message received from the eNB 121, and determines whether or not the XRES corresponds to the RES. Upon a determination that the XRES corresponds to the RES, the control plane identifier comparator 318 compares (3) the control plane eNB-UE-S1AP-ID in the Authentication Response message received from the HSS 11 to either the eNB-UE-S1AP-ID in the Initial Context Setup Request message received from the eNB 121 or the eNB-UE-S1AP-ID in the Initial Context Setup Response message received from the MME 113, and determines whether or not the two eNB-UE-S1AP-IDs correspond to each other.

Also, in such a third embodiment of the monitoring probe 13, upon a determination that the control plane eNB-UE-S1AP-ID in the Authentication Response message received from the HSS 11 corresponds to either the eNB-UE-S1AP-ID in the Initial Context Setup Request message received from the eNB 121 or the eNB-UE-S1AP-ID in the Initial Context Setup Response message received from the MME 113 (that is, comparison (iii)), the user plane identifier output 319 outputs (a) the user plane eNB IP address or the user plane eNB TEID received by the control plane message monitor 313 from the eNB 121 or (b) the user plane S-GW IP address or the user plane S-GW TEID received by the control plane message monitor 313 from the MME 113, such that the user plane eNB IP address, the user plane eNB TEID, the user plane S-GW IP address or the user plane S-GW TEID is identified with the user device identifier (that is, the IMSI or GUTI) of the user device 122 received by the control plane message monitor 313 from the eNB 121.

It is envisaged that the comparisons (1), (2) and (3) in this third embodiment of the monitoring probe 13 may not be in sequence. For example, the control plane identifier comparator 318 may compare the sequence number in the Authentication Information Request message received from the MME 113 to the sequence number in the Authentication Information Answer message received from the HSS 111 and determine whether or not the two sequence numbers correspond to each other (that is, comparison (1)), in response to a determination that the XRES corresponds to the RES. That is, the control plane identifier comparator 318 may compare the XRES in the Authentication Information Answer message received from the HSS 111 to the RES in the Authentication Response message received from the eNB 121 and determines whether or not the XRES corresponds to the RES (that is, comparison (2)), before comparing the sequence number in the Authentication Information Request message received from the MME 113 to the sequence number in the Authentication Information Answer message received from the HSS 111 and determining whether or not the two sequence numbers correspond to each other (that is, comparison (1)).

Figure 5:
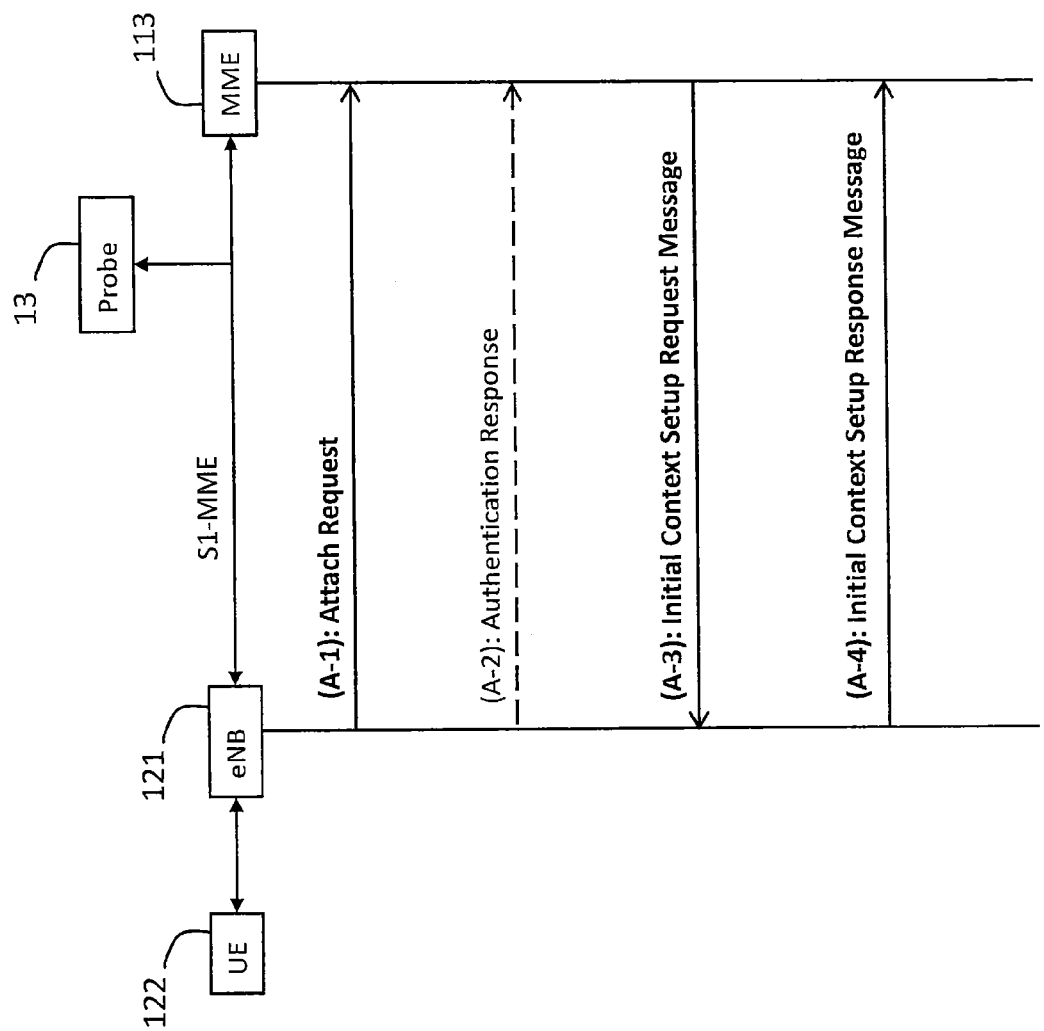
FIG. 5 is a flow diagram of an embodiment of a method of identifying a user plane identifier of a user device of a network by the monitoring probe of FIG. 1.

FIG. 5 is a flow diagram of an embodiment of a method of identifying a user plane identifier of a user device 122 of a network 10 by the monitoring probe 13. In this embodiment, the user device 122 is identified by a user device identifier in the form of an IMSI received from a control plane message in the form an Attach Request message.

At step (A-1), the control plane message monitor 313 implemented by the processor unit 131 of the monitoring probe 13 monitors, via an input network interface 134 of the monitoring probe 13, an eNB 121 (that is, an eNB 121 in communication with the user device 122) of the network 10 on the S1-MME interface between the eNB 121 and a corresponding MME 113 (that is, a MME 113 in communication with the eNB 121 in communication with the user device 122) of the network 10, for receipt of a first control plane message in the form of an Attach Request message transmitted from the eNB 121 to the MME 113. In this embodiment, the Attach Request message includes a user device identifier (that is, an identifier of the user device 122) in the form of an IMSI and a first control plane identifier in the form of an eNB-UE-S1AP-ID. Persons skilled in the art will appreciate that the Attach Request message may include other identifiers such as a control plane eNB IP address or a MME IP address.

At step (A-2), the control plane message monitor 313 monitors the eNB 121, via the above mentioned input network interface 134, for receipt of an Authentication Response message transmitted from the eNB 121 to the MME 113 on the S1-MME interface, the Authentication Response message comprising control plane identifiers in the form of a MME-UE-S1AP-ID and an eNB-UE-S1AP-ID. Then, the control plane identifier comparator 318 implemented by the monitoring probe 13 compares the eNB-UE-S1AP-ID received from the Authentication Response message to the eNB-UE-S1AP-ID received from the Attach Request message, and determines whether or not the eNB-UE-S1AP-ID received from the Authentication Response message corresponds to the eNB-UE-S1AP-ID received from the Attach Request message. Upon a determination by the control plane identifier comparator 318 that the eNB-UE-S1AP-ID received from the Authentication Response message corresponds to the eNB-UE-S1AP-ID received from the Attach Request message, the monitoring probe 13 associates the MME-UE-S1AP-ID received from the Authentication Response message with the IMSI received from the Attach Request message.

It is envisaged that the MME-UE-S1AP-ID received from the Authentication Response message may be associated with the IMSI received from the Attach Request message in different ways. For example, the MME-UE-S1AP-ID may be associated with the IMSI, by storing the MME-UE-S1AP-ID in association with the IMSI in the storage unit 132. Another example may be to output the MME-UE-S1AP-ID together with the IMSI.

Persons skilled in the art will appreciate that the Authentication Response message may include other identifiers such as a control plane eNB IP address, a MME IP address, or both a control plane eNB IP address and a MME IP address. It is envisaged that the monitoring probe 13 may associate other identifiers (such as a MME IP address) from the Authentication Response message with the IMSI received from the Attach Request message. Also, step (A-2) is optional such that the method may not include step (A-2).

At step (A-3), the control plane message monitor 313 monitors, via another input network interface 134 of the monitoring probe 13, the MME 113 on the S1-MME interface between the eNB 121 and the MME 113 for receipt of an Initial Context Setup Request message transmitted from the MME 113 to the eNB 121, the Initial Context Setup Request message comprising control plane identifiers in the form of an eNB-UE-S1AP-ID and a MME-UE-S1AP-ID and user plane identifiers in the form of S-GW TEID and a S-GW IP Address. Then, the control plane identifier comparator 318 compares the eNB-UE-S1AP-ID received from the Initial Context Setup Request message to the eNB-UE-S1AP-ID received from the Attach Request message previously received by the control plane message monitor 313, and determines whether or not the two control plane identifiers correspond to each other.

Upon a determination by the control plane identifier comparator 318 that the eNB-UE-S1AP-ID received from the Initial Context Setup Request message corresponds to the eNB-UE-S1AP-ID received from the Attach Request message previously received by the control plane message monitor 313, the user plane identifier output 319 implemented by the processor unit 131 outputs one or both of the user plane identifiers (that is, the user plane S-GW TEID, the user plane S-GW IP Address, or the user plane S-GW TEID and the user plane S-GW IP Address) received from the Initial Context Setup Request message, such that the user plane identifier or identifiers are identified as a user plane identifier or identifiers of the user device 122 (that is, such that the user plane identifier or identifiers are identified with the user device identifier (that is, the IMSI) of the user device 122 received by the control plane message monitor 313 from the eNB 121.

It is envisaged that the control plane identifier comparator 318 may alternatively compare the MME-UE-S1AP-ID received from the Initial Context Setup Request message to the MME-UE-S1AP-ID associated with the IMSI in the storage unit 132, and determine whether or not the two MME-UE-S1AP-IDs correspond to each other, and that the user plane identifier output 319 may, upon a determination that the two MME-UE-S1AP-IDs correspond to each other, output one or both of the user plane identifiers received from the Initial Context Setup Request message, such that the user plane identifier or identifiers are identified as a user plane identifier or identifiers of the user device 122 of the user device 122 received by the control plane message monitor 313 from the eNB 121.

The user plane identifier or identifiers (that is, the user plane S-GW TEID, the user plane S-GW IP Address, or the user plane S-GW TEID and the user plane S-GW IP Address) is then output by the user plane identifier output 319 to the CEM system 150, via the output network interface 133 of the monitoring probe 13, for identifying data packets of the user device 122 from the eNB 121 to the S-GW 120 in the user plane (that is, on the S1-U interface between the S-GW 120 and the eNB 121) based on the user plane identifier or identifiers.

At step (A-4), the control plane message monitor 313 monitors the eNB 121, via the above mentioned input network interface 134, for receipt of an Initial Context Setup Response message transmitted from the eNB 121 to the MME 113 on the S1-MME interface, the Initial Context Setup Response message comprising control plane identifiers in the form of a eNB-UE-S1AP-ID and a MME-UE-S1AP-ID and user plane identifiers in the form of an eNB TEID and an eNB IP Address. Then, the control plane identifier comparator 318 compares the eNB-UE-S1AP-ID received from the Initial Context Setup Response message to the eNB-UE-S1AP-ID received from the Attach Request message previously received by the control plane message monitor 313, and determines whether or not the two control plane identifiers correspond to each other.

Upon a determination by the control plane identifier comparator 318 that the eNB-UE-S1AP-ID received from the Initial Context Setup Response message corresponds to the eNB-UE-S1AP-ID received from the Attach Request message previously received by the control plane message monitor 313, the user plane identifier output 319 implemented by the processor unit 131 outputs one or both of the user plane identifiers (that is, the user plane eNB TEID, the user plane eNB IP Address, or the user plane eNB TEID and the user plane eNB IP Address) received from the Initial Context Setup Response message, such that the user plane identifier or identifiers are identified as a user plane identifier or identifiers of the user device 122 (that is, such that the user plane identifier or identifiers are identified with the user device identifier (that is, the IMSI or GUTI) of the user device 122 received by the control plane message monitor 313 from the eNB 121. It is envisaged that the control plane identifier comparator 318 may alternatively compare the MME-UE-S1AP-ID received from the Initial Context Setup Response message to the MME-UE-S1AP-ID associated with the IMSI in the storage unit 132, and determine whether or not the two MME-UE-S1AP-IDs correspond to each other, and that the user plane identifier output 319 may, upon a determination that the two MME-UE-S1AP-IDs correspond to each other, output one or both of the user plane identifiers received from the Initial Context Setup Response message, such that the user plane identifier or identifiers are identified as a user plane identifier or identifiers of the user device 122 of the user device 122 received by the control plane message monitor 313 from the eNB 121.

The user plane identifier or identifiers (that is, the user plane eNB TEID, the user plane eNB IP Address, or the user plane eNB TEID and the user plane eNB IP Address) is then output by the user plane identifier output 319 to the CEM system 150, via the output network interface 133 of the monitoring probe 13, for identifying data packets of the user device 122 from the S-GW 120 to the eNB 121 in the user plane (that is, on the S1-U interface between the S-GW 120 and the eNB 121) based on the user plane identifier or identifiers.

Persons skilled in the art will appreciate that the method of FIG. 5 is advantageous in that it does not involve monitoring (or "sniffing") packets on the S11 interface between the MME 113 and the S-GW 120.

Figure 6:
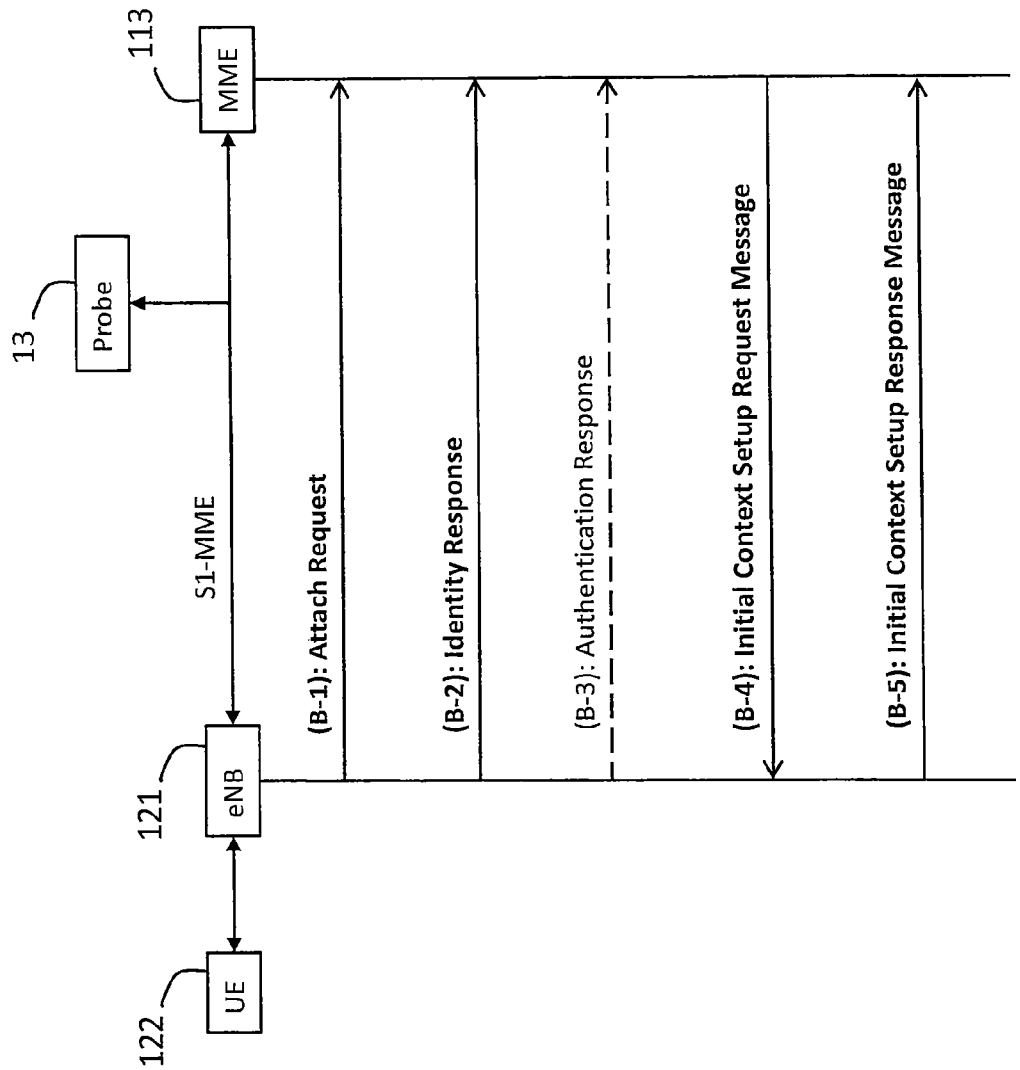
FIG. 6 is a flow diagram of another embodiment of a method of identifying a user plane identifier of a user device of a network by the monitoring probe of FIG. 1.

FIG. 6 is a flow diagram of another embodiment of a method of identifying a user plane identifier of a user device 122 of a network 10 by the monitoring probe 13. Like the method of FIG. 5, the user device 122 is identified by a user device identifier in the form of an IMSI. However, unlike the method of FIG. 5, the IMSI is received from a control plane message in the form of an Identity Response message instead of an Attach Request message.

At step (B-1), the control plane message monitor 313 monitors, via an input network interface 134 of the monitoring probe 13, an eNB 121 (that is, an eNB 121 in communication with the user device 122) of the network 10 on the S1-MME interface between the eNB 121 and a corresponding MME 113 (that is, a MME 113 in communication with the eNB 121 in communication with the user device 122) of the network 10, for receipt of a first control plane message in the form of an Attach Request message transmitted from the eNB 121 to the MME 113. In this embodiment, the Attach Request message includes a user device identifier (that is, an identifier of the user device 122) in the form of a GUTI and a first control plane identifier in the form of an eNB-UE-S1AP-ID. As indicated above, the Attach Request message may include other identifiers such as a control plane eNB IP address or a MME IP address.

In this embodiment, the monitoring probe 13 associates the user device identifier (that is, the GUTI) in the Attach Request message with the eNB-UE-S1AP-ID received from the Attach Request message. It is envisaged that the GUTI may be associated with the eNB-UE-S1AP-ID in different ways. For example, the GUTI may be associated with the eNB-UE-S1AP-ID, by storing the GUTI in association with the eNB-UE-S1AP-ID in the storage unit 132, or by outputting the GUTI together with the eNB-UE-S1AP-ID.

At step (B-2), the control plane message monitor 313 monitors the eNB 121, via the above mentioned input network interface 134, for receipt of an Identity Response message transmitted from the eNB 121 to the MME 113 on the S1-MME interface, the Identity Response message comprising a user device identifier in the form of a IMSI and a first control plane identifier in the form of an eNB-UE-S1AP-ID.

Then, the control plane identifier comparator 318 compares the eNB-UE-S1AP-ID received from the Identity Response message to the eNB-UE-S1AP-ID received from the Attach Request message previously received by the control plane message monitor 313, and determines whether or not the two control plane identifiers correspond to each other. Upon a determination by the control plane identifier comparator 318 that the eNB-UE-S1AP-ID received from the Identity Response message corresponds to the eNB-UE-S1AP-ID received from the Attach Request message previously received by the control plane message monitor 313, the monitoring probe 13 associates the GUTI received from the Attach Request message with the IMSI received from the Identity Response message, for example, by storing the GUTI in association with the IMSI in the storage unit 132.

At step (B-3), the control plane message monitor 313 monitors the eNB 121, via the above mentioned input network interface 134, for receipt of an Authentication Response message transmitted from the eNB 121 to the MME 113 on the S1-MME interface. Like step (A-2) of FIG. 5, the Authentication Response message comprises control plane identifiers in the form of a MME-UE-S1AP-ID and an eNB-UE-S1AP-ID. Then, the control plane identifier comparator 318 compares the eNB-UE-S1AP-ID received from the Authentication Response message to the eNB-UE-S1AP-ID received from either the Attach Request message or the Identity Response message, and determines whether or not the two eNB-UE-S1AP-IDs correspond to each other. Upon a determination by the control plane identifier comparator 318 that the two eNB-UE-S1AP-IDs correspond to each other, the monitoring probe 13 associates the MME-UE-S1AP-ID received from the Authentication Response message with the IMSI received from the Attach Request message, for example, by storing the MME-UE-S1AP-ID in association with the IMSI in the storage unit 132.

Persons skilled in the art will appreciate that the Authentication Response message may include other identifiers such as a control plane eNB IP address, a MME IP address, or both a control plane eNB IP address and a MME IP address. It is envisaged that the monitoring probe 13 may associate other identifiers (such as a MME IP address) from the Authentication Response message with the IMSI received from the Attach Request message. Also, step (B-3) is optional such that the method may not include step (B-3).

At step (B-4), the control plane message monitor 313 monitors, via another input network interface 134 of the monitoring probe 13, the MME 113 on the S1-MME interface between the eNB 121 and the MME 113 for receipt of an Initial Context Setup Request message transmitted from the MME 113 to the eNB 121. Like step (A-3) of FIG. 5, the Initial Context Setup Request message comprises control plane identifiers in the form of an eNB-UE-S1AP-ID and a MME-UE-S1AP-ID and user plane identifiers in the form of S-GW TEID and a S-GW IP Address.

Then, the control plane identifier comparator 318 compares the eNB-UE-S1AP-ID received from the Initial Context Setup Request message to the eNB-UE-S1AP-ID received from either the Attach Request message or the Identity Response message previously received by the control plane message monitor 313, and determines whether or not the two eNB-UE-S1AP-IDs correspond to each other. Upon a determination by the control plane identifier comparator 318 that the two eNB-UE-S1AP-IDs correspond to each other, the user plane identifier output 319 implemented by the processor unit 131 outputs one or both of the user plane identifiers (that is, the user plane S-GW TEID, the user plane S-GW IP Address, or the user plane S-GW TEID and the user plane S-GW IP Address) received from the Initial Context Setup Request message, such that the user plane identifier or identifiers are identified as a user plane identifier or identifiers of the user device 122 (that is, such that the user plane identifier or identifiers are identified with the user device identifier (that is, the IMSI) of the user device 122 received by the control plane message monitor 313 from the eNB 121.

Like in step (A-3) of FIG. 5, the control plane identifier comparator 318 may alternatively compare the MME-UE-S1AP-ID received from the Initial Context Setup Request message to the MME-UE-S1AP-ID associated with the IMSI in the storage unit 132, and determine whether or not the two MME-UE-S1AP-IDs correspond to each other, and that the user plane identifier output 319 may, upon a determination that the two MME-UE-S1AP-IDs correspond to each other, output one or both of the user plane identifiers received from the Initial Context Setup Request message, such that the user plane identifier or identifiers are identified as a user plane identifier or identifiers of the user device 122 received by the control plane message monitor 313 from the eNB 121.

Also, the user plane identifier or identifiers (that is, the user plane S-GW TEID, the user plane S-GW IP Address, or the user plane S-GW TEID and the user plane S-GW IP Address) may then be output by the user plane identifier output 319 to the CEM system 150, via the output network interface 133 of the monitoring probe 13, for identifying data packets of the user device 122 from the eNB 121 to the S-GW 120 in the user plane (that is, on the S1-U interface between the S-GW 120 and the eNB 121) based on the user plane identifier or identifiers.

At step (B-5), the control plane message monitor 313 monitors the eNB 121, via the above mentioned input network interface 134, for receipt of an Initial Context Setup Response message transmitted from the eNB 121 to the MME 113 on the S1-MME interface. Like in step (A-4) of FIG. 5, the Initial Context Setup Response message comprises control plane identifiers in the form of an eNB-UE-S1AP-ID and a MME-UE-S1AP-ID and user plane identifiers in the form of an eNB TEID and an eNB IP Address.

Then, the control plane identifier comparator 318 compares the eNB-UE-S 1AP-ID received from the Initial Context Setup Response message to the eNB-UE-S1AP-ID received from either the Attach Request message or the Identity Response message previously received by the control plane message monitor 313, and determines whether or not the two eNB-UE-S1AP-IDs correspond to each other. Upon a determination by the control plane identifier comparator 318 that the two eNB-UE-S1AP-IDs correspond to each other, the user plane identifier output 319 implemented by the processor unit 131 outputs one or both of the user plane identifiers (that is, the user plane eNB TEID, the user plane eNB IP Address, or the user plane eNB TEID and the user plane eNB IP Address) received from the Initial Context Setup Response message, such that the user plane identifier or identifiers are identified as a user plane identifier or identifiers of the user device 122 (that is, such that the user plane identifier or identifiers are identified with the user device identifier (that is, the IMSI or GUTI) of the user device 122 received by the control plane message monitor 313 from the eNB 121.

It is envisaged that the control plane identifier comparator 318 may alternatively compare the MME-UE-S1AP-ID received from the Initial Context Setup Response message to the MME-UE-S1AP-ID associated with the IMSI in the storage unit 132, and determine whether or not the two MME-UE-S1AP-IDs correspond to each other, and that the user plane identifier output 319 may, upon a determination that the two MME-UE-S1AP-IDs correspond to each other, output one or both of the user plane identifiers received from the Initial Context Setup Response message, such that the user plane identifier or identifiers are identified as a user plane identifier or identifiers of the user device 122 received by the control plane message monitor 313 from the eNB 121.

Like in step (A-4) of FIG. 5, the user plane identifier or identifiers (that is, the user plane eNB TEID, the user plane eNB IP Address, or the user plane eNB TEID and the user plane eNB IP Address) is then output by the user plane identifier output 319 to the CEM system 150, via the output network interface 133 of the monitoring probe 13, for identifying data packets of the user device 122 from the S-GW 120 to the eNB 121 in the user plane (that is, on the S1-U interface between the S-GW 120 and the eNB 121) based on the user plane identifier or identifiers.

Figure 7:
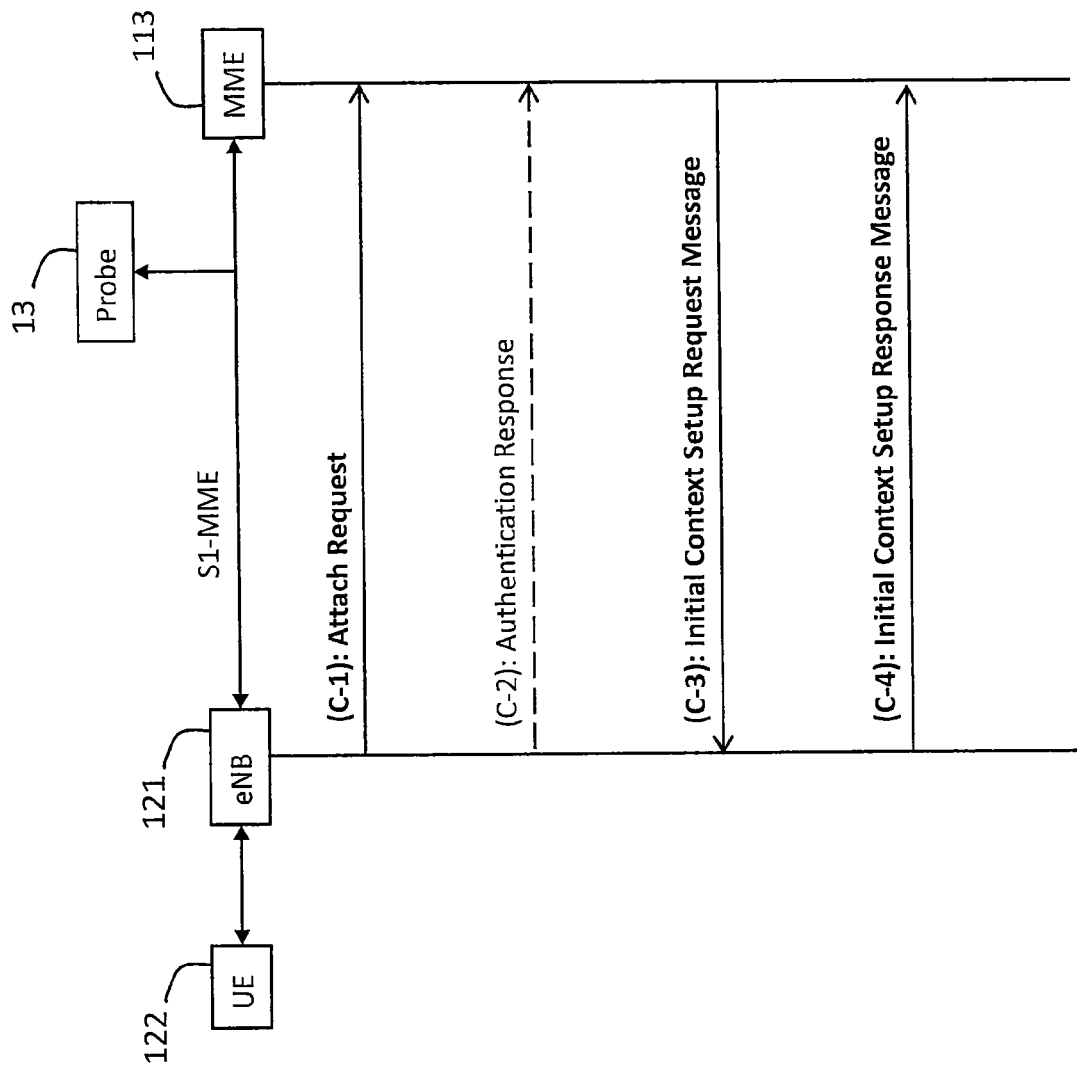
FIG. 7 is a flow diagram of yet another embodiment of a method of identifying a user plane identifier of a user device of a network by the monitoring probe of FIG. 1.

FIG. 7 is a flow diagram of yet another embodiment of a method of identifying a user plane identifier of a user device 122 of a network 10 by the monitoring probe 13. The method comprises steps (C-1), (C-2), (C-3), and (C-4) corresponding respectively to steps (B-1), (B-3), (B-4) and (B-5) of FIG. 6.

In this embodiment, the user device 122 is identified by a user device identifier in the form of a GUTI received from a control plane message in the form an Attach Request message. Thus, the control plane identifiers received by the control plane monitor 313 are associated with the GUTI received in the Attach Request message by the control plane monitor 313 and the user plane identifiers received by the control plane monitor 313 are outputted to the CEM system 150 such that the user plane identifier or identifiers are identified with the GUTI, unlike the method of FIG. 6 where the control plane identifiers received by the control plane monitor 313 are associated with an IMSI received in an Identity Response message by the control plane monitor 313 and the user plane identifiers received by the control plane monitor 313 are outputted to the CEM system 150 such that the user plane identifier or identifiers are identified with the IMSI. It is envisaged that the CEM system 150 may, upon receipt of the user plane identifier or identifiers identified with the GUTI from the monitoring probe 13, additionally query a network device (such as the MME 113) for an IMSI corresponding to the GUTI.

Figure 8:
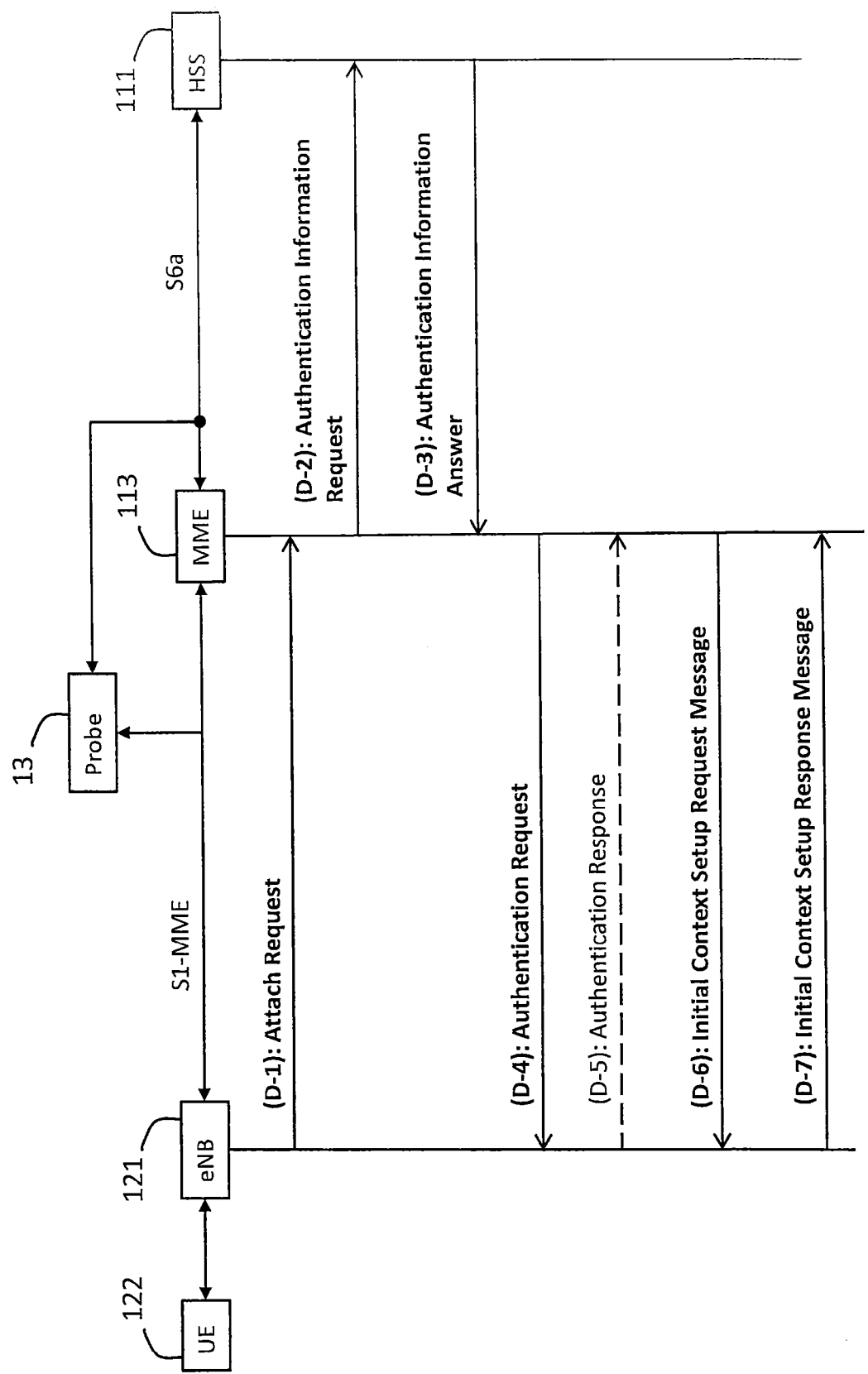
FIG. 8 is a flow diagram of yet another embodiment of a method of identifying a user plane identifier of a user device of a network by the monitoring probe of FIG. 1.

FIG. 8 is a flow diagram of another embodiment of a method of identifying a user plane identifier of a user device 122 of a network 10 by the monitoring probe 13. Like the methods of FIGS. 5 and 6, the user device 122 is identified by a user device identifier in the form of an IMSI. However, unlike the methods of FIGS. 5 and 6 where the IMSI is received from an Attach Request message transmitted from an eNB 121 to a corresponding MME 113, the IMSI is received from a control plane message in the form of an Authentication Information Request message transmitted from a MME 113 to a corresponding HSS 111.

At step (D-1), the control plane message monitor 313 monitors, via an input network interface 134 of the monitoring probe 13, the eNB 121 in communication with the user device 122 on the S1-MME interface between the eNB 121 and a corresponding MME 113 (that is, a MME 113 in communication with the eNB 121 in communication with the user device 122) of the network 10, for receipt of a control plane message in the form of an Attach Request message transmitted from the eNB 121 to the MME 113. In this embodiment, the Attach Request message includes a user device identifier in the form of a GUTI and control plane identifiers in the form of an eNB-UE-S1AP-ID and an eNB IP address. As indicated above, the Attach Request message may include other identifiers such as a control plane MME IP address.

At step (D-2), the control plane message monitor 313 monitors, via another input network interface 134 of the monitoring probe 13, the MME 113 in communication with the eNB 121 on the S6a interface between the MME 113 and a corresponding HSS 111 (that is, a HSS 111 in communication with the MME 113 in communication with the eNB 121 in communication with the user device 122) of the network 10, for receipt of a control plane message in the form of an Authentication Information Request message transmitted from the MME 113 to the HSS 111. The Authentication Information Request message includes a user device identifier in the form of an IMSI and a control plane identifier in the form of a sequence number.

At step (D-3), the control plane message monitor 313 monitors, via yet another input network interface 134 of the monitoring probe 13, the HSS 111 on the S6a interface between the MME 113 and the HSS 111, for receipt of a control plane message in the form of an Authentication Information Answer message transmitted from the HSS 111 to the MME 113. The Authentication Information Answer message includes a control plane parameter in the form of an expected authentication result (XRES) and a control plane identifier in the form of a sequence number.

At step (D-4), the control plane message monitor 313 monitors the MME 113 on the S1-MME interface between the eNB 121 and the MME 113, for receipt of a control plane message in the form of an Authentication Request message transmitted from the MME 113 to the eNB 121. The Authentication Request message includes control plane parameters in the form of an eNB-UE-S1AP-ID and a MME-UE-S1AP-ID.

It is envisaged that the MME-UE-S1AP-ID received from the Authentication Request message may be associated with the GUTI received from the Attach Request message, if the eNB-UE-S1AP-ID received from the Authentication Request message corresponds to the eNB-UE-S1AP-ID received from the Attach Request message.

At step (D-5), the control plane message monitor 313 monitors the eNB 121 on the S1-MME interface between the eNB 121 and the MME 113, for receipt of a control plane message in the form of an Authentication Response message transmitted from the eNB 121 to the MME 113. The Authentication Response message includes control plane parameters in the form of an eNB-UE-S1AP-ID and a MME-UE-S1AP-ID and a control plane parameter in the form of an authentication result (RES). Persons skilled in the art will appreciate that the Authentication Response message may include other identifiers such as a control plane eNB IP address, a MME IP address, or both a control plane eNB IP address and a MME IP address.

Then, the control plane identifier comparator 318 compares the RES received from the Authentication Response message to the XRES received from the Authentication Information Answer, and determines whether or not the RES corresponds to the XRES. Upon a determination that the RES corresponds to the XRES, the control plane identifier comparator 318 compares the sequence number received from the Authentication Information Answer message with the sequence number received from the Authentication Information Request message, and determines whether the two sequence numbers correspond to each other. Upon a determination that the two sequence numbers correspond to each other, the monitoring probe 13 associates one or both of the control plane identifiers (that is, the eNB-UE-S1AP-ID, the MME-UE-S1AP-ID, or both the eNB-UE-S1AP-ID and the MME-UE-S1AP-ID) received from the Authentication Response message with the IMSI received from the Authentication Information Request message.

It is envisaged that, in another embodiment, the comparison between the sequence number received from the Authentication Information Answer message with the sequence number received from the Authentication Information Request message may alternatively be carried out before the comparison between the RES received from the Authentication Response message with the XRES received from the Authentication Information Answer.

At step (D-6), the control plane message monitor 313 monitors the MME 113 on the S1-MME interface between the eNB 121 and the MME 113 for receipt of an Initial Context Setup Request message transmitted from the MME 113 to the eNB 121. Like step (A-3) of FIG. 5, the Initial Context Setup Request message comprises control plane identifiers in the form of an eNB-UE-S1AP-ID and a MME-UE-S1AP-ID and user plane identifiers in the form of S-GW TEID and a S-GW IP Address.

Then, the control plane identifier comparator 318 compares the eNB-UE-S1AP-ID received from the Initial Context Setup Request message to the eNB-UE-S1AP-ID received from the Authentication Response message, and determines whether or not the two eNB-UE-S1AP-IDs correspond to each other. Upon a determination by the control plane identifier comparator 318 that the two eNB-UE-S1AP-IDs correspond to each other, the user plane identifier output 319 implemented by the processor unit 131 outputs one or both of the user plane identifiers (that is, the user plane S-GW TEID, the user plane S-GW IP Address, or the user plane S-GW TEID and the user plane S-GW IP Address) received from the Initial Context Setup Request message, such that the user plane identifier or identifiers are identified as a user plane identifier or identifiers of the user device 122 (that is, such that the user plane identifier or identifiers are identified with the user device identifier (that is, the IMSI) of the user device 122 received by the control plane message monitor 313 from the eNB 121. Like the methods of FIGS. 5 to 7, in an alternative embodiment, the control plane identifier comparator 318 may alternatively compare the MME-UE-S1AP-ID received from the Initial Context Setup Request message to either a MME-UE-S1AP-ID associated with the IMSI in the storage unit 132 or the MME-UE-S1AP-ID received from the Authentication Response message.

At step (D-7), the control plane message monitor 313 monitors the eNB 121 for receipt of an Initial Context Setup Response message transmitted from the eNB 121 to the MME 113 on the S1-MME interface. Like in step (A-4) of FIG. 5, the Initial Context Setup Response message comprises control plane identifiers in the form of an eNB-UE-S1AP-ID and a MME-UE-S1AP-ID and user plane identifiers in the form of an eNB TEID and an eNB IP Address.

Then, the control plane identifier comparator 318 compares the eNB-UE-S 1AP-ID received from the Initial Context Setup Response message to the eNB-UE-S1AP-ID received from the Authentication Response message, and determines whether or not the two eNB-UE-S1AP-IDs correspond to each other. Upon a determination by the control plane identifier comparator 318 that the two eNB-UE-S1AP-IDs correspond to each other, the user plane identifier output 319 implemented by the processor unit 131 outputs one or both of the user plane identifiers (that is, the user plane eNB TEID, the user plane eNB IP Address, or the user plane eNB TEID and the user plane eNB IP Address) received from the Initial Context Setup Response message, such that the user plane identifier or identifiers are identified as a user plane identifier or identifiers of the user device 122 (that is, such that the user plane identifier or identifiers are identified with the user device identifier (that is, the IMSI or GUTI) of the user device 122 received by the control plane message monitor 313 from the eNB 121.

Further aspects of the monitoring probe 13 will be apparent from the above description of the monitoring probe 13. Persons skilled in the art will also appreciate that any of the methods described above could be embodied in program code. The program code could be supplied in a number of ways, for example on a tangible computer readable medium, such as a disc or a memory or as a data signal.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

I claim:

1. An apparatus for identifying a user plane identifier of a user device by a monitoring probe in communication with a first network device and a second network device, the apparatus comprising:
   first circuitry for monitoring the first network device for receipt of a first control plane message comprising a first control plane identifier and a user device identifier;
   second circuitry for monitoring, in response to receipt of the first control plane message, the second network device for receipt of a second control plane message comprising a second control plane identifier and a user plane identifier;
   a comparator for comparing, in response to receipt of the second control plane message, the first control plane identifier with the second control plane identifier in order to determine whether or not the first control plane identifier corresponds to the second control plane identifier;
   output circuitry for outputting, in response to a determination that the first control plane identifier corresponds to the second control plane identifier, the user plane identifier such that the user plane identifier is identified as the user plane identifier of the user device;
   said second circuitry for monitoring the second network device for receipt of a third control plane message comprising another user device identifier and a third control plane identifier;
   third circuitry for monitoring, in response to receipt of the third control plane message, a third network device for receipt of a fourth control plane message comprising a fourth control plane identifier and a first control plane parameter;
   a second comparator for comparing, in response to receipt of a fourth control plane message, the third control plane identifier with the fourth control plane identifier in order to determine whether or not the third control plane identifier corresponds to the fourth control plane identifier;
   said first circuitry for monitoring, in response to a determination that the third control plane identifier corresponds to the fourth control plane identifier, the first network device for receipt of a fifth control plane message comprising a sixth control plane message and a seventh control plane message;
   a third comparator for comparing, in response to receipt of a fifth control plane message, the first control plane parameter with the second control plane parameter in order to determine whether or not the first control plane parameter corresponds to the second control plane parameter;
   a fourth comparator for comparing, in response to a determination that the first control plane parameter corresponds to the second control plane parameter, the sixth control plane message with the first control plane identifier in order to determine whether or not the sixth control plane message corresponds to the first control plane identifier; and
   said output circuitry for outputting, in response to a determination that the sixth control plane message corresponds to the first control plane identifier, the other user device identifier such that the other user plane identifier is identified as the user plane identifier of the user device.

2. The apparatus as claimed in claim 1, wherein the user plane identifier of the user device is arranged to identify one or more data packets transmitted from the first network device to the second network device.

3. The apparatus as claimed in claim 2, wherein the first network device is an evolved NodeB (eNB) and the second network device is a Mobility Management Entity (MME).

4. The apparatus as claimed in claim 3, wherein the second control plane message is an Initial Context Setup Request Message, and the user plane identifier is a user plane Serving-Gateway Internet Protocol address (S-GW IP address) or a user plane Serving-Gateway Tunnelling End Identity (S-GW TEID).

5. The apparatus as claimed in claim 1, wherein the user plane identifier is output in association with the user device identifier to a memory for storage, in order to identify the user plane identifier as the user plane identifier of the user device.

6. The apparatus as claimed in claim 1, wherein each one of the first control plane identifier and the second control plane identifier is an evolved NodeB S1 Application Protocol Identifier (eNB-UE-S1AP-ID).

7. The apparatus as claimed in claim 1, wherein the first control plane message is an Attach Request message or an Identity Response message.

8. The apparatus as claimed in claim 7, wherein the user device identifier is an International Mobile Subscriber Identity (IMSI) or a Globally Unique Temporary Identity (GUTI).

9. The apparatus as claimed in claim 1, wherein the third network device is a Home Subscriber Server (HSS).

10. The apparatus as claimed in claim 9, wherein the third control plane message is an Authentication Information Request message, the fourth control plane message is an Authentication Information Answer message, and the fifth control plane message is an Authentication Response message.

11. The apparatus as claimed in claim 10, wherein the other user device identifier is an International Mobile Subscriber Identity (IMSI), each one of the third control plane identifier and the fourth control plane identifier is a sequence number, the first control plane parameter is an expected authentication result (XRES) parameter, the sixth control plane message is an evolved NodeB S1 Application Protocol Identifier (eNB-UE-S1AP-ID), and the second control plane parameter is an authentication result (RES) parameter.

12. The apparatus as claimed in claim 1 wherein said first and second comparators are the same.

13. The apparatus as claimed in claim 1 wherein said third and fourth comparators are the same.

* * * * *